(12) United States Patent
Miginnis (10) Patent No.: US 12,309,352 B2
(45) Date of Patent: May 20, 2025

(54) IN-FIELD CALIBRATION TECHNIQUES FOR CAMERAS

(71) Applicant: Apple Inc., Cupertino, CA (US)

(72) Inventor: Emily Miginnis, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 372 days.

(21) Appl. No.: 17/854,967

(22) Filed: Jun. 30, 2022

(65) Prior Publication Data

US 2024/0007614 A1    Jan. 4, 2024

(51) Int. Cl.
G06K 9/00    (2022.01)
G06T 7/20    (2017.01)
G06T 7/80    (2017.01)
H04N 17/00   (2006.01)

(52) U.S. Cl.
CPC ............. *H04N 17/002* (2013.01); *G06T 7/20* (2013.01); *G06T 7/80* (2017.01); *G06T 2207/30204* (2013.01); *G06T 2207/30244* (2013.01)

(58) Field of Classification Search
CPC ........... H04N 17/002; G06T 7/20; G06T 7/80; G06T 2207/30204; G06T 2207/30244
See application file for complete search history.

(56) References Cited

U.S. PATENT DOCUMENTS

| | | |
|---|---|---|
| 6,597,406 B2 | 7/2003 | Gloudemans et al. |
| 8,405,739 B2 | 3/2013 | Tanaka |
| 8,441,551 B2 | 5/2013 | Greenland et al. |
| 8,558,161 B2 | 10/2013 | Ong et al. |
| 8,745,240 B2 | 6/2014 | Horiuchi |
| 8,760,624 B2 | 6/2014 | Donaher |
| 9,131,219 B2 | 9/2015 | Doucet et al. |
| 9,171,379 B2 | 10/2015 | Mack et al. |
| 9,307,163 B2 | 4/2016 | Aota |

(Continued)

FOREIGN PATENT DOCUMENTS

| | | | | |
|---|---|---|---|---|
| CA | 3080002 C | * | 4/2019 | |
| CN | 110824653 A | * | 2/2020 | ............. G02B 27/62 |

(Continued)

OTHER PUBLICATIONS

An Improved Camera Calibration Method Using the Fiducial Marker System, Hao Yongtao et al., IEEE, 2010, pp. 195-201 (Year: 2010).*

*Primary Examiner* — Jayesh A Patel
(74) *Attorney, Agent, or Firm* — Brownstein Hyatt Farber Schreck, LLP (57) ABSTRACT

In some aspects, a fiducial marking is provided on a lens element of a camera. The fiducial marking may provide a projection onto an image sensor of the camera. Changes in the projection of the fiducial marking may be used to determine a change in position of the lens element. The camera may be calibrated based on changes in the position of the lens element, which may improve image quality and/or align image frames from the camera with image frames from another camera. In some aspects, multiple fiducial markings are provided on the lens element, which may provide more accurate positioning information about the lens element. In some aspects, one or more fiducial markings are provided on multiple lens elements of the camera so that changes in the position of each lens element can be determined and calibrated for.

20 Claims, 9 Drawing Sheets

(56) References Cited

U.S. PATENT DOCUMENTS

| | | | |
|---|---|---|---|
| 9,589,348 B1 | 3/2017 | Linde et al. | |
| 10,140,705 B2 | 11/2018 | Wu et al. | |
| 10,353,167 B2* | 7/2019 | Wang | H04N 23/57 |
| 10,540,014 B2 | 1/2020 | Gribetz et al. | |
| 10,623,727 B1* | 4/2020 | Frevert | H04N 17/002 |
| 10,663,567 B2* | 5/2020 | Fenton | G01S 7/4972 |
| 10,819,914 B2 | 10/2020 | Hamaguchi | |
| 11,156,456 B2 | 10/2021 | Chen et al. | |
| 11,539,902 B2 | 12/2022 | Nam et al. | |
| 11,877,071 B1 | 1/2024 | Orlowski et al. | |
| 2005/0271421 A1 | 12/2005 | Uemura et al. | |
| 2010/0159434 A1* | 6/2010 | Lampotang | G09B 23/28 |
| | | | 434/365 |
| 2014/0043524 A1* | 2/2014 | Azuma | H04N 23/57 |
| | | | 348/345 |
| 2016/0214546 A1* | 7/2016 | Eytan | H04N 17/002 |
| 2020/0160560 A1* | 5/2020 | Besley | H04N 23/683 |
| 2021/0096385 A1* | 4/2021 | Gupta | G02B 27/32 |
| 2021/0225033 A1* | 7/2021 | Yuan | G06T 7/80 |
| 2021/0270948 A1* | 9/2021 | Villalobos-Martinez | |
| | | | G01S 7/497 |
| 2022/0006931 A1* | 1/2022 | Tobaly | H04N 23/23 |
| 2022/0405970 A1* | 12/2022 | Park | A61B 6/583 |

FOREIGN PATENT DOCUMENTS

| | | | | |
|---|---|---|---|---|
| JP | 10172907 | * | 6/1996 | |
| WO | WO-2011014340 A2 | * | 2/2011 | G03B 13/22 |
| WO | WO-2013140795 A1 | * | 9/2013 | H04N 9/3182 |
| WO | WO-2017112045 A1 | * | 6/2017 | G06T 7/002 |
| WO | WO-2019067283 A1 | * | 4/2019 | G01B 11/2504 |

* cited by examiner

IN-FIELD CALIBRATION TECHNIQUES FOR CAMERAS

TECHNICAL FIELD

The described embodiments relate generally to in-field calibration techniques for cameras, and in particular to in-field calibration techniques for cameras to compensate for physical changes in the camera that may occur over time.

BACKGROUND

Cameras continue to be an important feature of consumer electronic devices such as smartphones, tablets, and computers. During manufacture, cameras are calibrated in an in-factory calibration process to account for things such as tolerances (e.g., in the position and orientation of lenses in a lens system of the camera). However, forces exerted on the camera over time, such as a user dropping the camera, and/or exposure to environmental conditions over time may cause physical changes in the camera that render the in-factory calibration inaccurate. This may in turn result in a degradation in image quality. Since these in-factory calibration processes are typically no longer available after the camera is fully assembled and integrated into an electronic device, it may be desirable to provide in-field (i.e., post-manufacture) calibration techniques to account for these physical changes in the camera.

SUMMARY

The present disclosure relates to cameras and electronic devices including cameras, and in particular to in-field calibration processes for identifying movement of one or more lens elements within a camera. In one aspect, an electronic device includes an image sensor, a lens element configured to direct light towards the image sensor, and processing circuitry communicably coupled to the image sensor. The lens element comprises a fiducial marking. The processing circuitry is configured to obtain a calibration image frame from the image sensor, identify a projection of the fiducial marking in the calibration image frame, compare the projection of the fiducial marking to a baseline projection of the fiducial marking, and determine a change in position of the lens element based on the comparison of the projection of the fiducial marking and the baseline projection of the fiducial marking. In some aspects, the processing circuitry may be further configured to determine a shift in an optical center of the lens element based on the change in position of the lens element. In some aspects, the processing circuitry may be further configured to obtain an image frame from the image sensor and process the image frame based at least in part on the optical center shift of the lens element to generate a processed image.

In some aspects, the lens element may include an additional fiducial marking. The processing circuitry may be further configured to identify a projection of the additional fiducial marking in the calibration image frame, compare the projection of the additional fiducial marking to a baseline projection of the additional fiducial marking, and determine the change in position of the lens element based on the comparison of the projection of the fiducial marking and the baseline projection of the fiducial marking and the comparison of the projection of the additional fiducial marking and the baseline projection of the additional fiducial marking.

In some aspects, the image sensor includes an imaging area and an overscan area, and one or more fiducial markings provided on the lens element are projected onto the overscan area of the image sensor.

In some aspects, comparing the projection of the fiducial marking and the baseline projection of the fiducial marking comprises comparing a position and size of the projection of the fiducial marking and the baseline projection of the fiducial marking.

In some aspects, the processing circuitry is further configured to obtain an initial calibration image frame from the image sensor, identify a projection of the fiducial marking in the initial calibration image frame, and store information about the projection of the fiducial marking in the initial calibration image frame as the baseline projection of the fiducial marking.

In some aspects, the processing circuitry is further configured to obtain the calibration image frame, identify the projection of the fiducial marking, compare the projection of the fiducial marking to the baseline projection of the fiducial marking, and determine the change in position of the lens element in response to detection of motion meeting a predetermined criteria.

In some aspects, a camera includes an image sensor, a lens holder, and a number of lens elements disposed in the lens holder. Each of the lens elements comprises a fiducial marking configured to provide a corresponding projection onto the image sensor when light is passed through the lens elements towards the image sensor. In some aspects, the fiducial markings from each of the lens elements may be uniquely identifiable based on a position of the projection provided therefrom on the image sensor. In some aspects, the fiducial markings from each of the lens elements may be uniquely identifiable based on a shape of the projection provided therefrom on the image sensor.

In some aspects, a method for operating an electronic device includes obtaining, from an image sensor of the electronic device, a calibration image frame, identifying, by processing circuitry of the electronic device, a projection of a fiducial marking provided on a lens element configured to direct light towards the image sensor in the calibration image frame, comparing, by the processing circuitry of the electronic device, the projection of the fiducial marking to a baseline projection of the fiducial marking, and determining, by the processing circuitry of the electronic device, a change in position of the lens element based on the comparison of the projection of the fiducial marking and the baseline projection of the fiducial marking. In some aspects, the method may further comprise determining, by the processing circuitry of the electronic device, a shift in an optical center of the lens element based on the change in position of the lens element. In some aspects, the method may further comprise obtaining an image frame from the image sensor, and processing the image frame based at least in part on the optical center shift of the lens element to generate a processing image.

In some aspects, the method may further comprise identifying, by the processing circuitry of the electronic device, a projection of an additional fiducial marking disposed on the lens element in the calibration image frame, comparing, by the processing circuitry of the electronic device, the projection of the additional fiducial marking to a baseline projection of the additional fiducial marking, and determining, by the processing circuitry of the electronic device, the change in position of the lens element based on the comparison of the projection of the fiducial marking and the baseline projection of the fiducial marking and the projection of the additional fiducial marking and the baseline projection of the additional fiducial marking.

In some aspects, the method may further comprise obtaining an initial calibration image frame from the image sensor, identifying a projection of the fiducial marking in the initial calibration image frame, and storing information about the projection of the fiducial marking in the initial calibration image frame as the baseline projection of the fiducial marking.

In some aspects, the method may further comprise detecting motion meeting a predetermined criteria, wherein obtaining the calibration image frame, identifying the projection of the fiducial marking, comparing the projection of the fiducial marking to the baseline projection of the fiducial marking, and determining the change in position of the lens element are done in response to the detection of motion meeting the predetermined criteria.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure relates to cameras and methods for operating cameras. In some aspects, a fiducial marking is provided on a lens element of a camera. The fiducial marking may provide a projection onto an image sensor of the camera. Changes in the projection of the fiducial marking may be used to determine a change in position of the lens element relative to an expected position of the lens element. The camera may be calibrated based on changes in the position of the lens element, which may improve image quality and/or align image frames from the camera with image frames from another camera. In some aspects, multiple fiducial markings are provided on the lens element, which may provide more accurate positioning information about the lens element. In some aspects, one or more fiducial markings are provided on multiple lens elements of the camera so that changes in the position of each lens element can be determined and calibrated for. These and other embodiments are discussed below with reference to FIGS. 1A-8. However, those skilled in the art will readily appreciate that the detailed description given herein with respect to these figures is for explanatory purposes only and should not be construed as limiting.

Figure 1A:
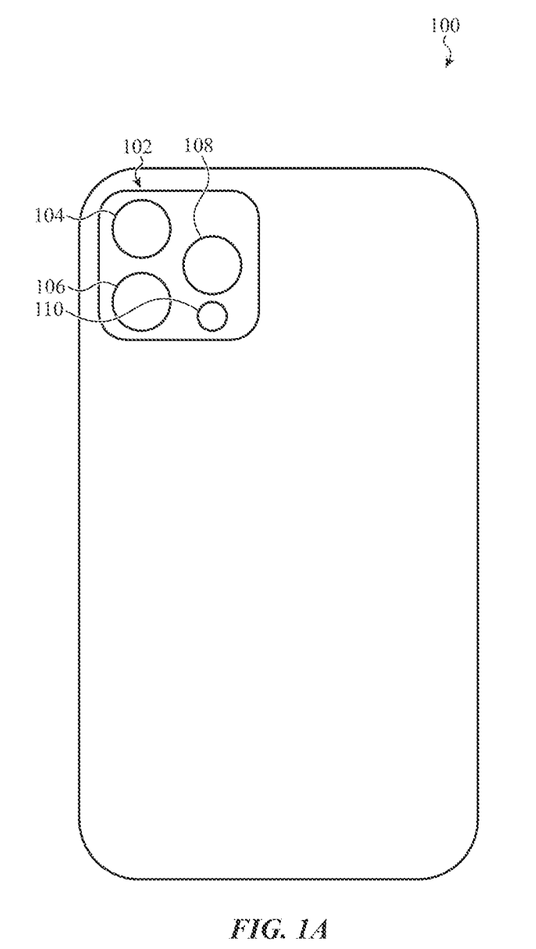
FIG. 1A shows a rear view of an exemplary electronic device, such as described herein.

FIG. 1A shows a rear view of an electronic device 100 comprising a multi-camera system 102 suitable for use with the various embodiments described herein. In general, the multi-camera system 102 comprises a first camera 104 and a second camera 106. The multi-camera system 102 may optionally include one or more additional cameras (e.g., a third camera 108 as shown in FIG. 1A) and/or one or more depth sensors (e.g., depth sensor 110 as shown in FIG. 1A). While FIG. 1A shows a multi-camera system 102, it should be appreciated that the techniques described here may be utilized by any camera or cameras of a single-camera or multi-camera system.

In some embodiments, the electronic device 100 is a portable multifunction electronic device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is separate from the computer system. As used herein, "displaying" content includes causing to display the content by transmitting, via wired or wireless connection, data (e.g., image data or video data) to an integrated or external display generation component to visually produce the content.

Figure 1B:
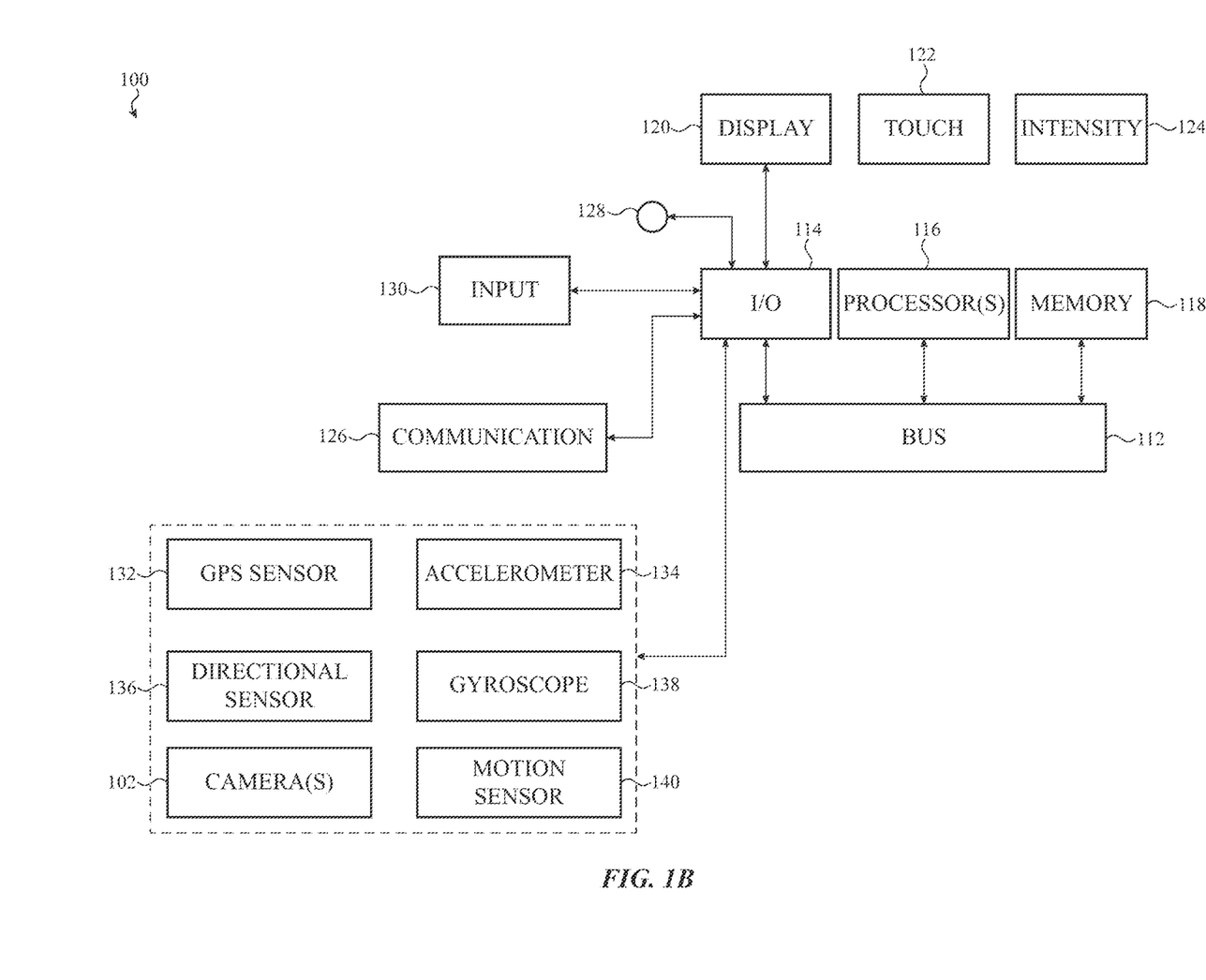
FIG. 1B is a block diagram illustrating components the exemplary electronic device of FIG. 1A.

FIG. 1B depicts exemplary components of the electronic device 100. In some embodiments, the electronic device 100 has a bus 112 that operatively couples an I/O section 114 with one or more computer processors 116 and a memory 118. The I/O section 114 can be connected to a display 120, which may have a touch-sensitive component 122 and, optionally, an intensity sensor 124 (e.g., contact intensity sensor). In addition, the I/O section 114 can be connected with a communication unit 126 for receiving application and operating system data, using, for example, Wi-Fi, Bluetooth, near field communication (NFC), cellular, and/or other wireless communication techniques. The electronic device 100 may include one or more user input mechanisms, including a first user input mechanism 128 and/or a second user input mechanism 130. The first user input mechanism 128 is, optionally, a rotatable input device or a depressible and rotatable input device, for example. The second user input mechanism 130 is, optionally, a button, in some examples. The electronic device 100 optionally includes various sensors, such as a GPS sensor 132, an accelerometer 134, a directional sensor 136 (e.g., compass), a gyroscope 138, a motion sensor 140, the multi-camera system 102, and/or a combination thereof, all of which can be operatively connected to the I/O section 114.

The memory 118 of electronic device 100 can include one or more non-transitory computer-readable storage mediums, for storing computer-executable instructions, which, when executed by one or more processors 116, for example, can cause the processors 116 to perform the techniques that are described herein (such as the in-field calibration techniques described herein). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 116 can include, for example, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of electronic device 100, as well as to facilitate capturing of images and in-field calibration as described herein. The processor 116 may be referred to herein as processing circuitry.

As described herein, the term "processor" and "processing circuitry" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements. Electronic device 100 is not limited to the components and configuration of FIG. 1B, but can include other or additional components in multiple configurations.

Figure 2A:
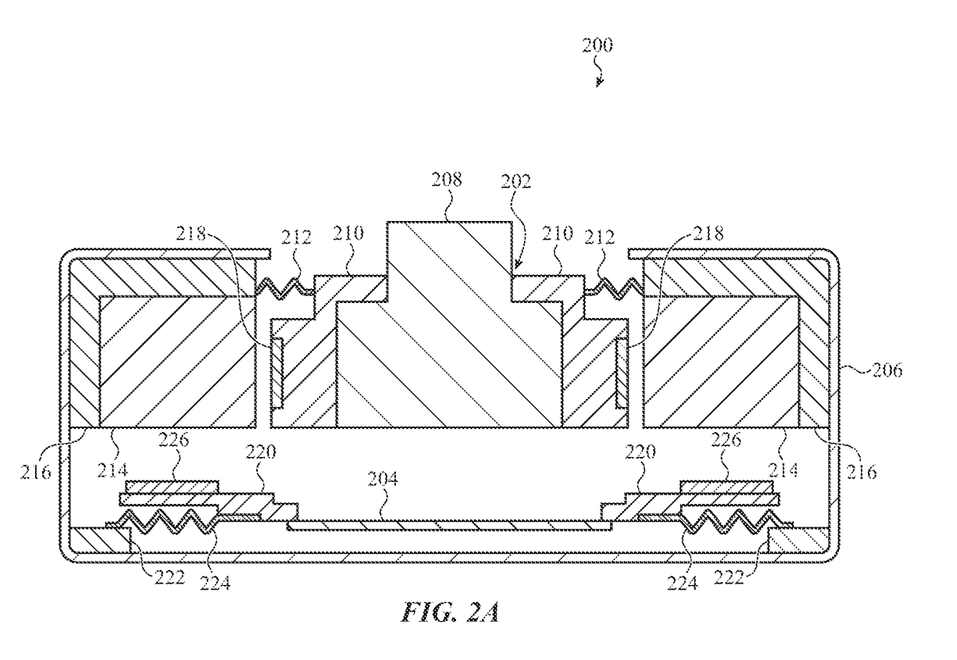
FIG. 2A is a cross-sectional side view of an exemplary camera, such as described herein.

FIG. 2A shows a cross-sectional side view of an illustrative example of a camera 200 that may be used according to the principles described herein, such as, for example, in the electronic device 100 in FIGS. 1A and 1B. The camera 200 may comprise a lens assembly 202, an image sensor 204, and a housing 206. The lens assembly 202 and the image sensor 204 may be disposed in the housing 206. The lens assembly 202 may comprise one or more lens elements 208, which are positioned and oriented within a lens holder 210 to direct light towards the image sensor 204. The camera 200 shown in FIG. 2A may be configured to move the lens assembly 202 along an optical axis of the camera 200 in order to adjust a focus of the camera 200 (e.g., via an autofocus operation), and further may be configured to move the image sensor 204 transverse to the optical axis to perform optical image stabilization.

To move the lens assembly 202 of the camera 200, the lens holder 210 may be suspended relative to a stationary portion of the camera 200 (e.g., the housing 206) via one or more focus suspension elements 212. The focus suspension elements 212 may comprise flexures (e.g., leaf spring(s), suspension wire(s), flexure arm(s), or the like) and/or one or more bearings (e.g., ball bearing(s), roller bearing(s), or the like). Magnets 214 may be fixed to the housing 206 via magnet holders 216. The lens holder 210 may be coupled to autofocus coils 218, each of which is positioned to be within the magnetic field of one or more of the magnets 214. When current is driven through the autofocus coils 218, Lorentz forces are generated that can create relative movement between the autofocus coils 218 and one or more of the magnets 214, which in turn may move the lens assembly 202 along the optical axis of the camera 200.

To move the image sensor 204 of the camera 200, the image sensor 204 may be coupled to a moveable platform 220, which is suspended from a stationary base 222 via one or more stabilization suspension elements 224. The stationary base 222 may be fixed relative to the housing 206. The stabilization suspension elements 224 may comprise flexures (e.g., leaf spring(s), suspension wire(s), flexure arm(s), or the like) and/or one or more bearings (e.g., ball bearing(s), roller bearing(s), or the like). In some instances the moveable platform 220 and the stabilization suspension elements 224 may support electrical traces (not shown), which may be used to carry signals to and from the image sensor 204 and to carry signals to and from stabilization coils 226 coupled to the moveable platform 220. The stabilization coils 226 may be positioned within the magnetic field of one or more of the magnets 214. When current is driven through the stabilization coils 226, Lorentz forces are generated that can create relative movement between the stabilization coils 226 and one or more of the magnets 214, which in turn may move the image sensor 204 in one or more directions perpendicular to the optical axis of the camera 200. It should be appreciated that the configuration of the camera 200 of FIG. 2A shows just one manner in which the camera 200 can control relative movement between the image sensor 204 and the lens assembly 202 (both along and transverse to the optical axis), and that other arrangements may be used to create this relative movement without departing from the principles described herein.

Figure 2B:
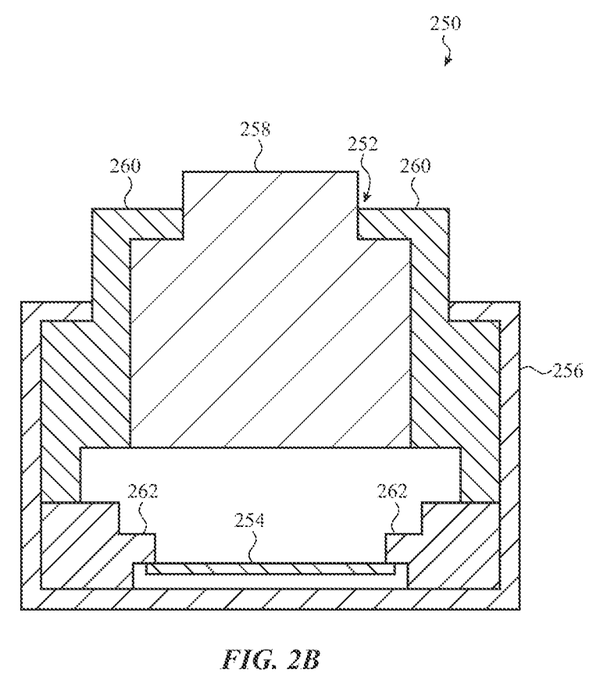
FIG. 2B is a cross-sectional side view of an exemplary camera, such as described herein.

Other cameras as described here may not allow for relative movement between the lens assembly and the image sensor along and/or transverse to the optical axis. FIG. 2B shows a cross-sectional side view of an illustrative example of a camera 250 that may be used according to the principles described herein, such as in the electronic device 100 in FIGS. 1A and 1B. The camera 250 in FIG. 2B is substantially similar to that described with respect to FIG. 2A, and includes a lens assembly 252 having a number of lens elements 258 and a lens holder 260, an image sensor 254, a housing 256, and a stationary platform 262. The components are arranged in a similar manner to that shown in FIG. 2A, except that the components for moving the lens assembly 252 and the image sensor 254 for adjusting focus and performing optical image stabilization, respectively, are omitted. Accordingly, the lens holder 260 is fixed to the housing 256, and the image sensor 254 is fixed to the stationary platform 262.

Figure 3A:
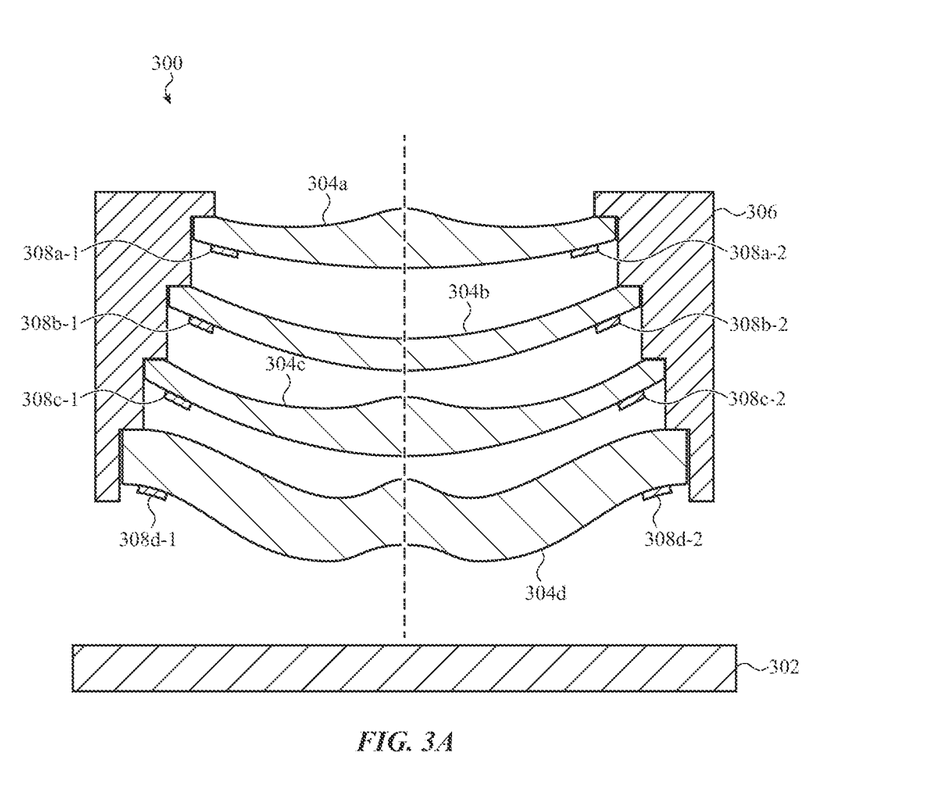
FIG. 3A is a cross-sectional side view of an exemplary lens assembly and an image sensor, such as described herein.

While the lens assemblies in FIGS. 2A and 2B are shown including a single lens element, a lens assembly may include several lens elements. To illustrate, FIG. 3A shows a cross-sectional side view of a lens assembly 300 that may be used according to the principles described herein, for example, in the cameras 200 in FIGS. 2A and 2B. For context, an image sensor 302 is also shown. The lens assembly 300 includes a number of lens elements 304 (specifically a first lens element 304*a*, a second lens element 304*b*, a third lens element 304*c*, and a fourth lens element 304*d*), which are positioned and oriented within a lens holder 306 to direct light towards the image sensor 302. The exemplary lens assembly 300 shown in FIG. 3A includes four lens elements 304, however, any number of lens elements 304, including a single lens element 304, may be used in various embodiments. The lens elements 304 may be fixed directly to the lens holder 306, or may be coupled to the lens holder 306 via any number of intermediate structural elements. In one example, the lens elements 304 may be glued to the lens holder 306. However, the lens elements 304 may be coupled directly or indirectly to the lens holder 306 in any suitable manner. While not shown, certain ones of the lens elements 304 may be coupled or fixed to one another, and the coupled or fixed pair of lens elements 304 may be coupled to the lens holder 306.

To account for manufacturing tolerances associated with the position of the lens elements 304 with respect to the image sensor 302 (which may be due to manufacturing tolerances associated with the position of the lens elements 304 within the lens holder 306 and/or the position of the lens holder 306 with respect to the image sensor 302), an in-factory calibration process may be performed on a camera including the lens assembly 300. The in-factory calibration process is designed to determine the relative position of the lens elements 304 with respect to the image sensor 302. Specifically, the in-factory calibration process may determine an optical center of each lens element 304 with respect to the image sensor 302 (which may collectively define an optical center for the overall lens assembly 300), as this information may be important for providing images having a desired quality. The result of the in-factory calibration process may be factory calibration data, which may subsequently be used to improve the image quality of a camera including the lens assembly 300. For example, the factory calibration data may be used to adjust an offset or setpoint for focusing, adjust an offset or setpoint for optical image stabilization, and/or adjust a spatial factor associated with one or more image processing pipelines for the camera.

During use of a camera including the lens assembly 300, the position of the lens elements 304 with respect to the image sensor 302 may change. For example, one or more lens elements 304 may shift vertically and/or laterally within the lens holder 306. As another example, the entire lens holder 306 may shift vertically and/or laterally with respect to the image sensor 302. This may be due, for example, to a force being exerted on the camera (e.g., a user dropping the camera), and/or exposure to environmental conditions over time (e.g., heat, direct sunlight, cold). If the position of any lens element 304 with respect to the image sensor 302 changes, as compared to the state at which the camera left the factory, the factory calibration data is no longer valid. In particular, the optical center of one or more lens elements 304 determined in the in-factory calibration process may now be incorrect. Continued use of the factory calibration data may therefore degrade image quality due to misalignments in focus, optical image stabilization, and image processing. Further, when a camera including the lens assembly 300 is part of a multi-camera system and/or a system that includes a depth sensor, continued use of the factory calibration data may result in degraded quality of applications utilizing multi-camera and/or depth sensor input. For example, in 3D rendering applications for simultaneous localization and mapping (SLAM), or so-called "mixed reality," in which 2D color data from a camera is mapped onto 3D point cloud data from a depth-sensing camera, failure to compensate for changes in position of the lens elements 304 (e.g., optical center shift) may result in a spatial mismatch between the 2D color data and the 3D point cloud data, resulting in sub-optimal or non-realistic rendering. In other words, continued use of factory calibration data after one or more lens elements 304 have changed position may result in degraded image quality from a single camera as well as reduced performance for multi-camera applications. Accordingly, an in-field calibration may be required from time-to-time, or may be required in response to a force being exerted on the camera.

To perform an in-field calibration, changes in the position of the lens elements 304 with respect to the image sensor 302 are determined. To facilitate the accurate and efficient determination of these changes as discussed herein, each lens element 304 may include one or more fiducial markings 308 disposed thereon. For example, in FIG. 3A each lens element 304 is shown having a first fiducial marking and a second fiducial marking. Specifically, the first lens element 304*a* is shown having a first fiducial marking 308*a*-1 and a second fiducial marking 308*a*-2, the second lens element 304*b* is shown having a first fiducial marking 308*b*-1 and a second fiducial marking 308*b*-2, the third lens element 304*c* is shown having a first fiducial marking 308*c*-1 and a second fiducial marking 308*c*-2, and the fourth lens element 304*d* is shown having a first fiducial marking 308*d*-1 and a second fiducial marking 308*d*-2. The fiducial markings 308 are disposed on each lens element 304 so that they provide a projection onto the image sensor 302. In some embodiments, the fiducial markings 308 are configured so that they provide a uniquely identifiable projection onto the image sensor 302, either due to the size of the projection, the shape of the projection, the color of the projection, and/or the position of the projection on the image sensor 302. In other words, the fiducial markings 308 may be configured so that the projections therefrom are able to be uniquely identified or associated with a particular lens element 304. The fiducial markings 308 may be integrated within the lens elements 304 or provided on an exterior surface of the lens elements 304. The fiducial markings 308 may comprise any material suitable for providing a projection onto the image sensor 302, and may be affixed to the lens elements 304 in any suitable manner. In some embodiments, the fiducial markings 308 may comprise stickers provided on the lens elements 304. In other embodiments, the fiducial markings 308 may be printed or painted onto the lens elements 304. The fiducial markings 308 may be opaque or semi-transparent.

Figure 3B:
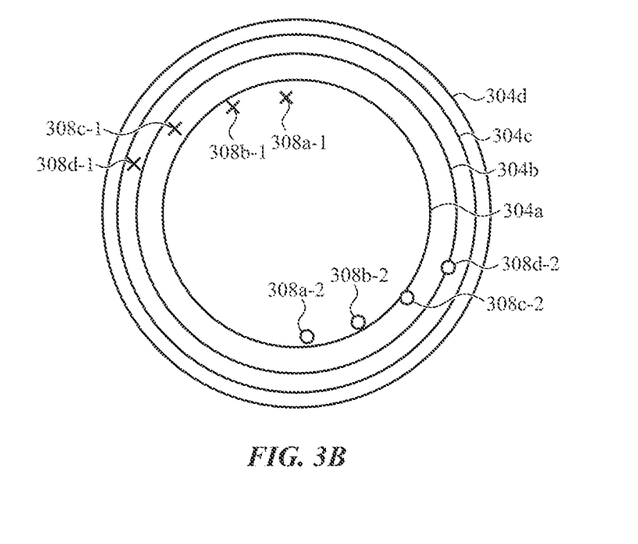
FIG. 3B is a top view of a number of exemplary lens elements of the lens assembly of FIG. 3A.

FIG. 3B shows a top view of the lens elements 304 of the lens assembly 300. For purposes of illustration, a first fiducial marking of each lens element 304 is shown as an "X" shape and a second fiducial marking of each lens element 304 is shown as an "O" shape. The differences in the fiducial markings 308 are to illustrate that each lens element 304 may include fiducial markings 308 that are different or distinctly identifiable from one another. Each fiducial marking of one lens element 304 may have the same or different shape than a fiducial marking of another lens element 304. Notably, the fiducial markings 308 shown are for purposes of illustration only and the present disclosure contemplates the use of fiducial markings 308 having any size, shape, color, etc. In various embodiments, the fiducial markings 308 for each lens element 304 may be the same or different size, shape, color, etc. Additionally, the positions of the fiducial markings 308 shown are for purposes of illustration only. In various embodiments, the fiducial markings 308 may be patterned on the lens elements 304 in any desired manner.

In some embodiments, two fiducial markings 308 from two different lens elements 304 may at least partially overlap depending on the current positioning of the lens elements 304. That is, the fiducial markings 308 of two lens elements 304 may overlap when looking along the optical axis of the lens assembly 300, or the projections of the fiducial markings 308 of two lens elements 304 onto the image sensor 302 may overlap. In these instances, the composite shape formed by the overlapping projections may be analyzed to determine the relative positions of the lens elements 304. Further, while all of the lens elements 304 are shown having fiducial markings 308, any subset of the lens elements 304 may include or not include fiducial markings 308 without departing from the principles described herein.

Figure 3C:
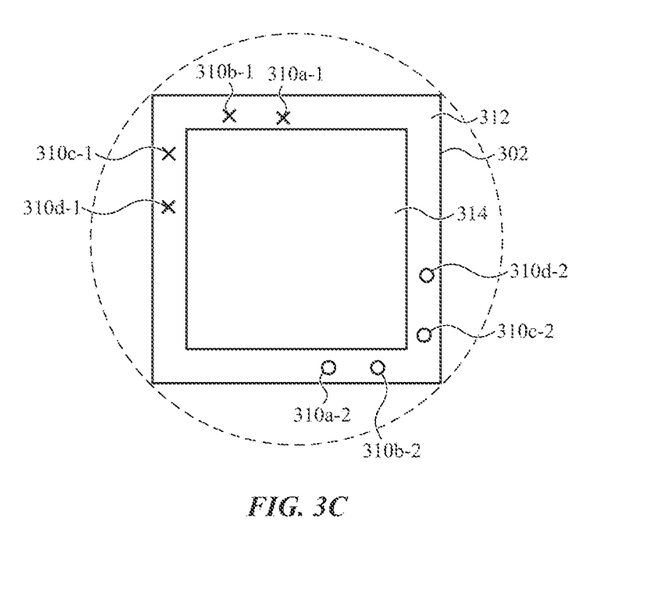
FIG. 3C is a top view of an exemplary image sensor of FIG. 3A.

FIG. 3C shows a top view of the image sensor 302 including projections 310 of each of the fiducial markings 308. Specifically, FIG. 3C shows a first projection 310a-1 of the first fiducial marking 308a-1 of the first lens element 304a, a second projection 310a-2 of the second fiducial marking 308a-2 of the first lens element 304a, a third projection 310b-1 of the first fiducial marking 308b-1 of the second lens element 304b, a fourth projection 310b-2 of the second fiducial marking 308b-2 of the second lens element 304b, a fifth projection 310c-1 of the first fiducial marking 308c-1 of the third lens element 304c, a sixth projection 310c-2 of the second fiducial marking 308c-2 of the third lens element 304c, a seventh projection 310d-1 of the first fiducial marking 308d-1 of the fourth lens element 304d, and an eighth projection 310d-2 of the second fiducial marking 308d-2 of the fourth lens element 304d. A dashed line shows an exemplary alignment of the lens elements 304 with the image sensor 302. The image sensor 302 includes an imaging area 312 and an overscan area 314. The lens elements 304 are arranged to direct light towards both the imaging area 312 and the overscan area 314. Further, the imaging area 312 and the overscan area 314 both include photosensors which provide data that can be used to generate an image frame. In a normal mode of operation, image frames from the image sensor 302 are generated using data from the imaging area 312, while data from the overscan area 314 is discarded. In an electronic image stabilization (EIS) mode of operation, image frames from the image sensor 302 may be generated using data from a cropped area, which includes a portion of the overscan area 314 and a portion of the imaging area 312. The cropped area is moved over time to reduce motion in resulting images or video footage such that the portion of the overscan area 314 and the portion of the imaging area 312 changes over time. Accordingly, as defined herein, an imaging area of an image sensor is an area of the image sensor from which image frames are generated during normal operation, while an overscan area of an image sensor is an area of the image sensor surrounding the imaging area used to generate image frames during a stabilized mode of operation. As shown, the fiducial markings 308 may be arranged on the lens elements 304 so that the projections 310 are within the overscan area 314. Accordingly, the projections 310 from the fiducial markings 308 will not show up in image frames generated during normal operation. In the EIS mode of operation, one or more projections 310 may be present in a generated image frame. The projections 310 may be filtered or otherwise removed from the image frame(s) in a post-processing operation. In other instances, the EIS mode of operation is constrained such that the cropped area is not moved to portions of image sensor 302 where the projections 310 are expected to be present.

Notably, it is not required for the fiducial markings 308 to be arranged so that the projections 310 therefrom are provided in the overscan area 314 of the image sensor 302. Doing so may simply reduce the impact of the fiducial markings 308 on the normal operation of a camera. In fact, the principles of the present disclosure may be used with image sensors that do not utilize an overscan area (i.e., with image sensor that do not use EIS, or otherwise use the entirety of the sensor). In various embodiments, some, all, or none of the fiducial markings 308 may be arranged so that the projections 310 therefrom are provided in an overscan area of an image sensor.

Figure 4:
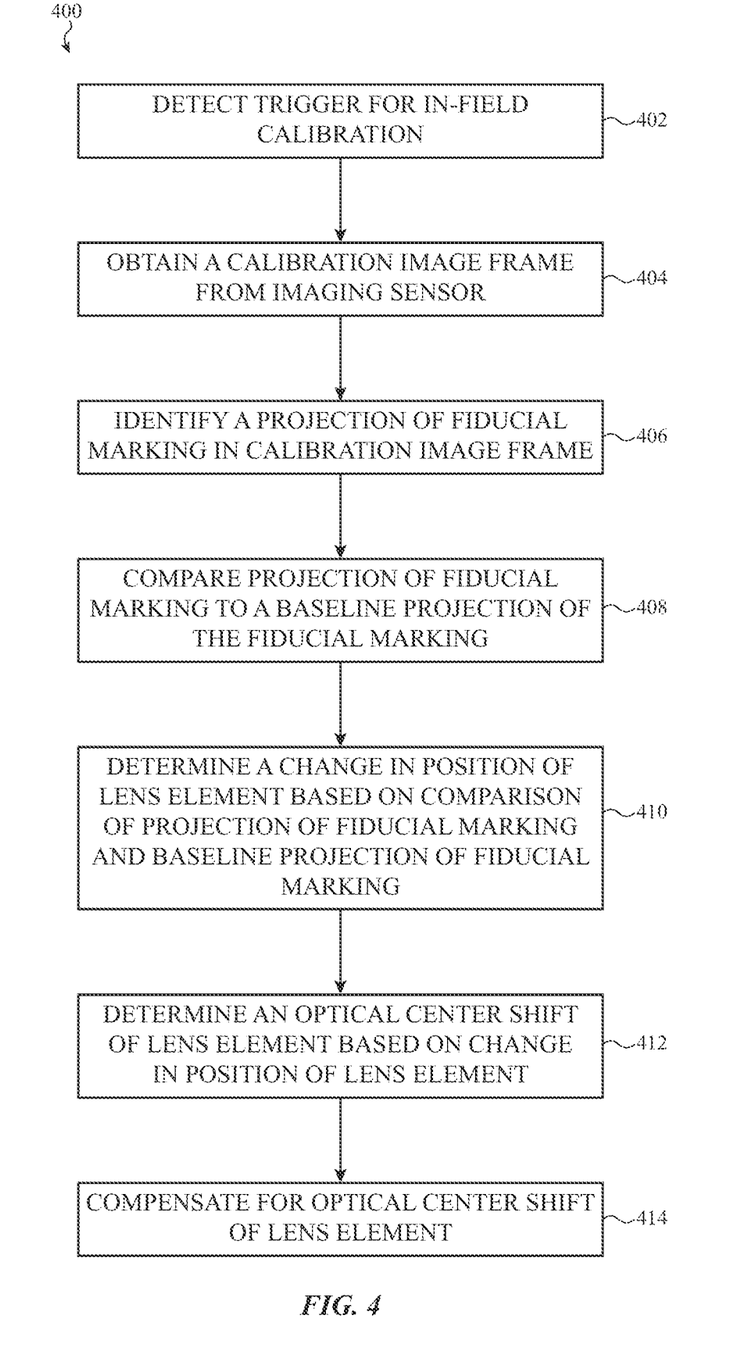
FIG. 4 is a flow diagram illustrating an exemplary method of operating a camera and/or electronic device, such as described herein.

FIG. 4 is a flow diagram illustrating an example method 400 for operating a camera utilizing at least one fiducial marking on a lens element as described herein to perform an in-field calibration process, which may be used, for example, in the cameras 200 in FIGS. 2A and 2B and the electronic device 100 in FIGS. 1A and 1B. First, a trigger for in-field calibration may be detected (step 402). The trigger for in-field calibration may be the detection of motion meeting a predetermined criteria, the detection of force above a threshold value (e.g., when a user drops the camera or the device including the camera), the detection of one or more environmental conditions (e.g., temperature above or below a threshold value, moisture), or a periodic trigger (e.g., once a week, once a month). The trigger for in-field calibration may be monitored constantly in the background, and may be detected using any number of sensors (e.g., an accelerometer, gyroscope, temperature sensor, moisture sensor).

In response to detection of the trigger for in-field calibration, a calibration image frame is obtained from an image sensor (step 404). Notably, the calibration image frame may represent the entirety of the image sensor, for example, both an imaging area and an overscan area of the image sensor as discussed herein. A projection of the fiducial marking in the calibration image frame is identified (step 406). Identifying the projection of the fiducial marking in the calibration image frame may comprise multiple steps, including, for example, image deconvolution for object recovery and shape recognition, as well as search, masking, and thresholding for finding and reading the fiducial marking. Those skilled in the art will readily appreciate that the projection of the fiducial marking may be identified in the calibration image frame in any number of suitable ways, all of which are contemplated herein. Depending on the environment in which the calibration image frame is taken, it may be difficult to identify the projection of the fiducial marking. For example, if the calibration image frame includes complex patterns or low light, it may be difficult to differentiate or isolate the projection of the fiducial marking from the actual image. Accordingly, in some aspects a user may be prompted to point the camera towards a wall or sparse surface having a desired brightness before the calibration image frame is obtained from the image sensor. This may be done proactively, or in response to a failure to identify the projection of the fiducial marking in one or more calibration image frames. Alternatively, calibration image frames can continue to be obtained on a periodic basis or in response to the detection of certain criteria (e.g., brightness above a threshold level) until a projection of the fiducial marking can be identified, and the process can proceed.

The identified projection of the fiducial marking is compared to a baseline projection of the fiducial marking (step 408). The baseline projection of the fiducial marking may be a projection of the fiducial marking obtained during an in-factory calibration process as discussed in further detail herein. Comparing the projection of the fiducial marking to the baseline projection of the fiducial marking may also comprise multiple steps, such as computing an x,y location and size of the projection of the fiducial marking and subsequently comparing it to the x,y location and size of the baseline projection of the fiducial marking.

A change in position of the lens element on which the fiducial marking is provided may be determined based on the comparison of the projection of the fiducial marking and the baseline projection of the fiducial marking (step 410). The change in position of the lens element may include both a decenter (in-plane movement) shift of the lens element and a tilt (rotation) of the lens element. Lens element decenter may be indicated by changes in the x,y location of the fiducial marking, while lens element tilt may be indicated by changes in the size of the fiducial marking. As discussed above, a value of particular interest to image quality may be the optical center of the lens element, so an optical center shift of the lens element may be determined based on the change in position of the lens element (step 412). The optical center shift may be the shift in the optical center of the lens element when compared to the optical center of the lens element when the baseline projection of the fiducial marking was taken, such as during an in-factory calibration process. There may be a known relationship between the optical center of the lens element and the position of the lens element (i.e., decenter and tilt). Such a relationship may be stored, for example, in a memory. Accordingly, determining the optical center shift based on the change in position of the lens element may be accomplished using a lookup table specifying such a relationship, or in any other suitable manner.

Any shift in the optical center of the lens element can then be compensated for (step 414). As discussed herein, compensation for optical center shift, or other changes in the position of the lens element, may include, for example, changing an offset or setpoint for focus and/or autofocus, changing an offset or setpoint for OIS and/or EIS, and changing a spatial component associated with one or more image processing pipelines. With respect to changing an offset or setpoint for OIS, those skilled in the art will appreciate that during OIS the image sensor of the camera is moved laterally relative to the lens assembly, or vice-versa, in an attempt to maintain the same view of the scene during small movements of the camera. When the camera is still, the image sensor may have a default position such that a particular spot on the image sensor is aligned with an optical center of the lens assembly. If a shift in the optical center of a lens element in the lens assembly is detected, this default position may be shifted so that a different spot on the image sensor is aligned with the optical center of the lens assembly. Generally, the shift in the optical center of the lens element, as well as any position change information about the lens element, can be used in any suitable manner for improving the operation of a camera including the lens element. In this way, the camera may use the determined optical center shift as feedback in setting one of the above parameters.

The above method 400 is discussed with respect to a single fiducial marking on a single lens element, and may be repeated for any number of fiducial markings on any number of lens elements. As discussed herein, lens assemblies according to the principles of the present disclosure may include fiducial markings that provide uniquely identifiable projections onto an image sensor so that it is known which lens element has shifted based on changes in certain fiducial markings. This may be based on the size, shape, color, or location of the projection of the fiducial marking on the image sensor. Further as discussed herein, a single lens element may include multiple fiducial markings. The fiducial markings may be disposed at some distance from one another, which may make it easier to determine certain information from the fiducial markings such as tilt of the lens element (e.g., if one fiducial marking is getting smaller while the other is getting larger).

The above method 400 may be performed by any processor or processing circuitry associated with a camera or an electronic device including a camera, such as the cameras 200 in FIGS. 2A and 2B and/or the electronic device 100 in FIGS. 1A and 1B.

Figure 5A:
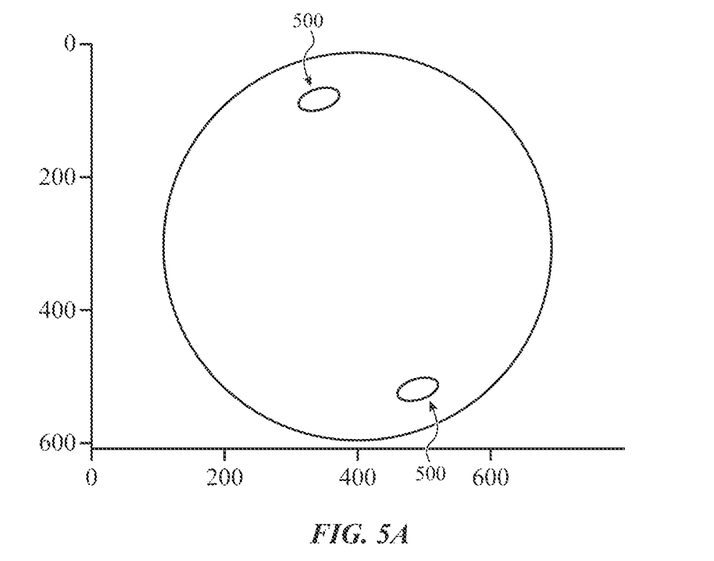
FIGS. 5A and 5B show exemplary calibration image frames illustrating an in-field calibration process, such as described herein.
Figure 5B:
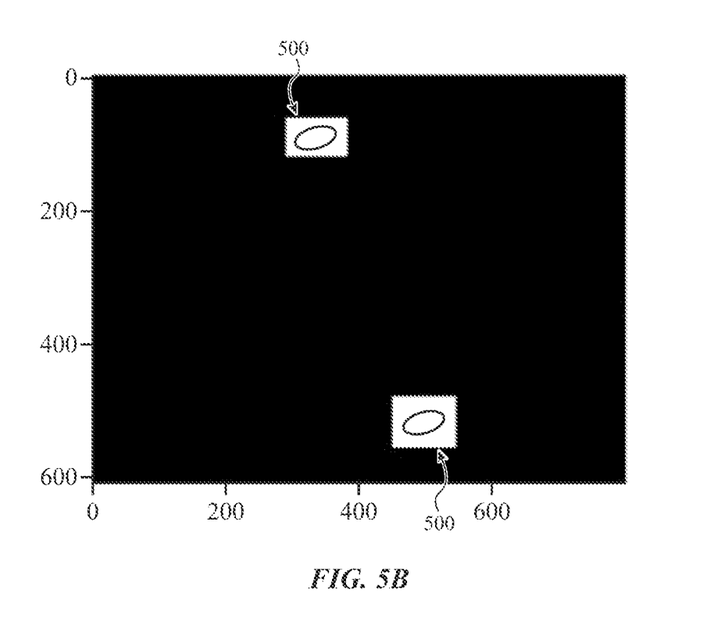

FIG. 5A shows an example calibration image frame obtained for an image sensor. Projections 500 of fiducial markings are shown in the calibration image frame. FIG. 5B shows the calibration image frame after identification of the projections 500. This may be, for example, after image deconvolution and masking of the projections 500. Both the x,y location and size of each projection 500 may indicate a change in position of a lens element, which may be used as discussed herein to compensate for things such as optical center shift.

Figure 6:
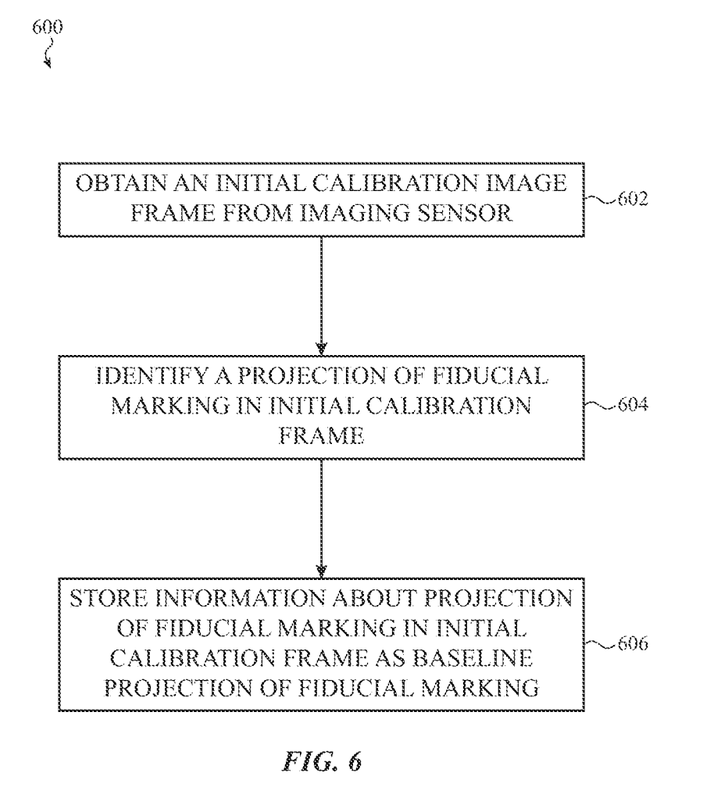
FIG. 6 is a flow diagram illustrating an exemplary method of operating a camera and/or electronic device, such as described herein.

As discussed herein, a projection of a fiducial marking is compared to a baseline projection of a fiducial marking to determine a change in position of a lens element. FIG. 6 is a flow diagram illustrating an example method 600 for obtaining a baseline projection of a fiducial marking on a lens element of a camera, which may be used, for example, in the cameras 200 in FIGS. 2A and 2B and the electronic device 100 in FIGS. 1A and 1B. The method 600 may be performed as part of an in-factory calibration process of the camera, or may be performed at any other time. An initial calibration image frame is obtained from an image sensor (step 602). A projection of the fiducial marking is identified in the initial calibration image frame (step 604). Identifying the projection of the fiducial marking in the initial calibration image frame may comprise multiple steps, including, for example, image deconvolution for object recovery and shape recognition, as well as search, making, and thresholding for finding the fiducial marking. Those skilled in the art will readily appreciate that the projection of the fiducial marking in the initial calibration image frame may be identified in any number of suitable ways, all of which are contemplated herein. Information about the projection of the fiducial marking in the calibration image frame may then be stored as the baseline projection of the fiducial marking (step 606). The information may include the x,y location and size of the projection of the fiducial marking, a processed version of the initial calibration image frame, or any other information that can be compared to a later identified projection of the fiducial marking to determine changes in position of the lens element. The information may be stored, for example, in a memory, and later retrieved during in-field calibration for comparison to the later identified projection of the fiducial marking as discussed herein The above method 600 may be performed by any processor or processing circuitry associated with a camera or an electronic device including a camera, such as the cameras 200 in FIGS. 2A and 2B and/or the electronic device 100 in FIGS. 1A and 1B.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device, comprising:
an image sensor;
a lens element configured to direct light towards the image sensor, the lens element comprising a fiducial marking; and
processing circuitry communicably coupled to the image sensor and configured to:
obtain a calibration image frame from the image sensor;
identify a projection of the fiducial marking in the calibration image frame;
compare the projection of the fiducial marking to a baseline projection of the fiducial marking; and
determine a change in position of the lens element based on the comparison of the projection of the fiducial marking and the baseline projection of the fiducial marking.

2. The electronic device of claim 1, wherein the processing circuitry is further configured to determine a shift in an optical center of the lens element based on the change in position of the lens element.

3. The electronic device of claim 2, wherein the processing circuitry is further configured to:
obtain an image frame from the image sensor; and
process the image frame based at least in part on the optical center shift of the lens element to generate a processed image.

4. The electronic device of claim 1, wherein:
the lens element comprises an additional fiducial marking; and
the processing circuitry is further configured to:
identify a projection of the additional fiducial marking in the calibration image frame;
compare the projection of the additional fiducial marking to a baseline projection of the additional fiducial marking; and
determine the change in position of the lens element based on the comparison of the projection of the fiducial marking and the baseline projection of the fiducial marking and the comparison of the projection of the additional fiducial marking and the baseline projection of the additional fiducial marking.

5. The electronic device of claim 4, wherein:
the image sensor comprises an imaging area and an overscan area; and
the fiducial marking and the additional fiducial marking are positioned on the lens element to project onto a portion of the overscan area of the image sensor.

6. The electronic device of claim 1, wherein comparing the projection of the fiducial marking and the baseline projection of the fiducial marking comprises comparing a position and a size of the projection of the fiducial marking and the baseline projection of the fiducial marking.

7. The electronic device of claim 1, further comprising a memory communicably coupled to the processing circuitry, wherein the processing circuitry is further configured to:
obtain an initial calibration image frame from the image sensor;
identify a projection of the fiducial marking in the initial calibration image frame; and
store information about the projection of the fiducial marking in the initial calibration image frame as the baseline projection of the fiducial marking.

8. The electronic device of claim 1, wherein:
the image sensor comprises an imaging area and an overscan area; and the fiducial marking is positioned on the lens element to project onto a portion of the overscan area of the image sensor.

9. The electronic device of claim 1, wherein the processing circuitry is further configured to obtain the calibration image frame, identify the projection of the fiducial marking, compare the projection of the fiducial marking to the baseline projection of the fiducial marking, and determine the change in position of the lens element in response to detection of motion meeting a predetermined criteria.

10. The electronic device of claim 1, wherein:
the electronic device further comprises an additional lens element between the lens element and the image sensor, the additional lens element configured to direct light towards the image sensor and comprising an additional fiducial marking; and
the processing circuitry is further configured to:
identify a projection of the additional fiducial marking in the calibration image frame;
compare the projection of the additional fiducial marking to a baseline projection of the additional fiducial marking; and
determine a change in position of the additional lens element based on the comparison of the projection of the additional fiducial marking and the baseline projection of the additional fiducial marking.

11. The electronic device of claim 10, wherein the processing circuitry is further configured to determine a shift in an optical center of the additional lens element based on change in position of the additional lens element.

12. A camera comprising:
an image sensor;
a lens holder; and
a plurality of lens elements disposed in the lens holder, each of the plurality of lens elements comprising a fiducial marking configured to provide a corresponding projection onto the image sensor when light is passed through the plurality of lens elements toward the image sensor.

13. The camera of claim 12, wherein the fiducial markings from the plurality of lens elements are uniquely identifiable based on a position of the projection provided therefrom on the image sensor.

14. The camera of claim 12, wherein the fiducial markings from the plurality of lens elements are uniquely identifiable based on a shape of the projection provided therefrom on the image sensor.

15. A method for operating an electronic device, comprising:
obtaining, from an image sensor of the electronic device, a calibration image frame;
identifying, by processing circuitry of the electronic device, a projection of a fiducial marking in the calibration image frame, the fiducial marking being disposed on a lens element configured to direct light towards the image sensor;
comparing, by the processing circuitry of the electronic device, the projection of the fiducial marking to a baseline projection of the fiducial marking; and
determining, by the processing circuitry of the electronic device, a change in position of the lens element based on the comparison of the projection of the fiducial marking and the baseline projection of the fiducial marking.

16. The method of claim 15, further comprising determining, by the processing circuitry of the electronic device, a shift in an optical center of the lens element based on the change in position of the lens element.

17. The method of claim 16, further comprising:
obtaining an image frame from the image sensor; and
processing the image frame based at least in part on the optical center shift of the lens element to generate a processed image.

18. The method of claim 15, further comprising:
identifying, by the processing circuitry of the electronic device, a projection of an additional fiducial marking in the calibration image frame, the additional fiducial marking being disposed on the lens element;
comparing, by the processing circuitry of the electronic device, the projection of the additional fiducial marking to a baseline projection of the additional fiducial marking; and
determining, by the processing circuitry of the electronic device, the change in position of the lens element based on the comparison of the projection of the fiducial marking and the baseline projection of the fiducial marking and the comparison of the projection of the additional fiducial marking and the baseline projection of the additional fiducial marking.

19. The method of claim 15, further comprising:
obtaining an initial calibration image frame from the image sensor;
identifying a projection of the fiducial marking in the initial calibration image frame; and
storing information about the projection of the fiducial marking in the initial calibration image frame as the baseline projection of the fiducial marking.

20. The method of claim 15, further comprising detecting motion meeting a predetermined criteria, wherein obtaining the calibration image frame, identifying the projection of the fiducial marking, comparing the projection of the fiducial marking to the baseline projection of the fiducial marking, and determining the change in position of the lens element are done in response to the detection of motion meeting the predetermined criteria.

* * * * *